(12) United States Patent
Briggman et al.

(10) Patent No.: US 10,671,963 B2
(45) Date of Patent: *Jun. 2, 2020

(54) SYSTEMS AND METHODS FOR CREATING AND USING A HYBRID-DIGITAL MAILBOX

(71) Applicant: United States Postal Service, Washington, DC (US)

(72) Inventors: Chandra A. Briggman, Springfield, VA (US); Jane Elizabeth Quenk, Washington, DC (US); Timothy M. Moran, National Harbor, MD (US); Kelley A. Sullivan, Alexandria, VA (US); Robert E. Dixon, Jr., Haymarket, VA (US)

(73) Assignee: UNITED STATES POSTAL SERVICE, Washington, DC (US)

( * ) Notice: Subject to any disclaimer, the term of this patent is extended or adjusted under 35 U.S.C. 154(b) by 39 days.

This patent is subject to a terminal disclaimer.

(21) Appl. No.: 16/005,655

(22) Filed: Jun. 11, 2018

(65) Prior Publication Data

US 2018/0293540 A1 Oct. 11, 2018

Related U.S. Application Data

(63) Continuation of application No. 13/618,897, filed on Sep. 14, 2012, now Pat. No. 9,996,813.

(Continued)

(51) Int. Cl.
*G06Q 10/00* (2012.01)
*G06Q 10/08* (2012.01)
(Continued)

(52) U.S. Cl.
CPC ....... *G06Q 10/0833* (2013.01); *G06Q 10/083* (2013.01); *G06Q 10/1093* (2013.01);
(Continued)

(58) Field of Classification Search
CPC .......... G06Q 10/0833; G06Q 10/1093; G06Q 10/083; H04L 51/34; H04L 51/14; H04L 51/22
See application file for complete search history.

(56) References Cited

U.S. PATENT DOCUMENTS 5,737,729 A * 4/1998 Denman .......... G07B 17/00193
700/231
6,078,907 A * 6/2000 Lamm .................. G06Q 20/102
705/40

(Continued)

OTHER PUBLICATIONS

Electronic bill presentment and payment—Is it just a click away? A Andreeff, LC Binmoeller, EM Boboch . . . - . . . Reserve Bank of . . . , 2001—chicagofed.org (Year: 2001).*

(Continued)

*Primary Examiner* — Jonathan G Sterrett
(74) *Attorney, Agent, or Firm* — Finnegan, Henderson, Farabow, Garrett & Dunner LLP

(57) ABSTRACT

A method, electronic device, and computer-readable storage medium are provided for populating a calendar. In one embodiment, a method is provided for receiving tracking data regarding a delivery item, calculating an expected delivery date for the delivery item, identifying one or more deadlines associated with the delivery item, based on the tracking information, and automatically populating a user's calendar with the expected delivery date and the one or more deadlines.

20 Claims, 8 Drawing Sheets

Related U.S. Application Data

(60) Provisional application No. 61/535,686, filed on Sep. 16, 2011, provisional application No. 61/618,329, filed on Mar. 30, 2012.

(51) Int. Cl.
  *H04L 12/58* (2006.01)
  *G06Q 10/10* (2012.01)

(52) U.S. Cl.
  CPC .............. *H04L 51/22* (2013.01); *H04L 51/34* (2013.01); *G06Q 10/10* (2013.01); *H04L 51/14* (2013.01)

(56) References Cited

U.S. PATENT DOCUMENTS

| | | | | |
|---|---|---|---|---|
| 7,395,243 | B1* | 7/2008 | Zielke | G06Q 20/10 |
| | | | | 705/39 |
| 7,657,466 | B2* | 2/2010 | Klingenberg | G06Q 10/08 |
| | | | | 705/334 |
| 8,527,284 | B2* | 9/2013 | Smith | G06Q 10/08 |
| | | | | 705/1.1 |
| 8,630,947 | B1* | 1/2014 | Freund | G06Q 10/109 |
| | | | | 705/40 |
| 8,781,923 | B2* | 7/2014 | Pitroda | G06Q 20/02 |
| | | | | 705/30 |
| 9,996,813 | B2* | 6/2018 | Briggman | H04L 51/34 |
| 2002/0123957 | A1* | 9/2002 | Notarius | G06Q 30/06 |
| | | | | 705/37 |
| 2002/0126817 | A1* | 9/2002 | Hariri | G06O 30/018 |
| | | | | 379/201.01 |
| 2004/0064408 | A1* | 4/2004 | Kight | G06Q 20/04 |
| | | | | 705/40 |
| 2004/0133440 | A1* | 7/2004 | Carolan | G06Q 10/10 |
| | | | | 705/38 |
| 2004/0139010 | A1* | 7/2004 | McMichael | G06Q 20/102 |
| | | | | 705/40 |
| 2004/0139033 | A1* | 7/2004 | Amato | G06Q 30/0283 |
| | | | | 705/400 |
| 2005/0219061 | A1* | 10/2005 | Lai | G06Q 20/0855 |
| | | | | 340/5.81 |
| 2007/0073551 | A1* | 3/2007 | Williams | G06Q 10/08 |
| | | | | 705/26.1 |
| 2010/0312715 | A1* | 12/2010 | Esque | G06Q 10/08 |
| | | | | 705/330 |
| 2012/0179606 | A1* | 7/2012 | Sagi | G06Q 10/103 |
| | | | | 705/40 |
| 2014/0164126 | A1* | 6/2014 | Nicholas | A63F 9/24 |
| | | | | 705/14.58 |

OTHER PUBLICATIONS

"Implementing the Intelligent Mail Barcode in the N-tiered Service Library of a Print Mail Enterprise", CE Bunch—2010—csuepress.columbusstate.edu (Year: 2010).*

"Intelligent Mail® Barcode Resources", Mar. 16, 2010. (Year: 2010).*

"Study of the key techniques for implementing barcode network" J Sun, H Zhao, G Hu—Computer and Information Science 2010, 2010—Springer (Year: 2010).*

The Postal Service Role in the Digital Age—Expanding the Postal Platform, Jun. 2011, retrieved from: http://ursamajorassociates.com/wp-content/uploads/2011/06/crri-digital-divide-paper-final.pdf (Year: 2011).*

* cited by examiner

FIG. 4

LOGGED IN AS GUEST   ACCOUNT SETTINGS   LOGOUT

400

402 — INBOX                                                                                                [DELETE] [ARCHIVE]

| TYPE | SENDER | SUBJECT | EST. DELIVERY | VIEW IMAGE | OFFERS | SELECT |
|---|---|---|---|---|---|---|
| ☑ FCM | IRS | REFUND | FRI 5/1/2011 | ☐ IMAGE | | ☐ |
| ⊗ PACKAGE | SHOWDAZZLE.COM | ORDER | FRI 5/1/2011 | ☐ IMAGE | | ☐ |
| ⊗ PROMO | BEST BUY | MEM. DAY SALE | | ☐ IMAGE | 🏷 VIEW BONUS | ☐ |
| $ BILL | VERIZON WIRELESS | MAY BILL | FRI 5/1/2011 | ☐ IMAGE | 🏷 VIEW BONUS | ☐ |
| ☐ PO BOX | FAIRFAX COUNTY TAX | BUSINESS TAX N | FRI 5/1/2011 | ☐ IMAGE | | ☐ |

<PREVIOUS 1 2 3 4 5 NEXT>

404 — OUTBOX                                            [CREATE MAIL] [CREATE PACKAGE] [DELETE] [ARCHIVE]

| TYPE | RECIPIENT | SUBJECT | QUANTITY | PROGRESS | ALERTS |
|---|---|---|---|---|---|
| ☑ FCM | MULTIPLE | BAR MITZVAH INVITATION | 200 | ▓▓▓▓▓ 50% | |
| ⊗ PACKAGE | BILL GATEY | EBAY ORDER | 1 | ▓▓▓▓▓▓▓▓ 90% | ⓘ |
| ⊗ PROMO | MULTIPLE | BOUTIQUE OPENING | 150 | ▓▓ | |
| ☑ FCM | MULTIPLE | PTA MEETING NOTICE | 80 | ░ | |

▨ RECEIVED   ▦ PROCESSING   ▨ OUT FOR DELIVERY

<PREVIOUS 1 2 3 4 5 NEXT>

---

406 — MY DASHBOARD
- INBOX: 5
- OUTBOX: 431
- BALANCE: $300

408 — MAILBOX
- > INBOX
- > OUTBOX
- > ARCHIVE

410 — APPS
- > GREETING CARD APP
- > DIRECT MAIL APP
- > BILLS APP   MORE

412 — ADDRESS BOOK
- > MY ADDRESSES (2)
- > CONTACTS (800)

414 — CALENDAR
- MILESTONE SAVED 35
- THIS WEEK 5
- VIEW MAIL HISTORY

416 — SUPPLIES
- ORDER HISTORY
- MORE

OFFERS
- LOYALTY CREDITS: $5
- BONUS OFFERS: 2

FIG. 5

USPS.COM

MAILASSIST
BY THE US POSTAL SERVICE

MONDAY, JULY 30TH

YOU HAVE 3 PACKAGES AND
5 PIECES OF MAIL SCHEDULED
FOR DELIVERY TODAY.

◇ MAIL
▱ PACKAGES

[ ADD TRACKING # ]  [ ☐ ] [ ☷ ]
[ ADD ]
ADD MULTIPLE TRACKING NUMBERS

HI GUEST ▾

| ARCHIVED | | | INCOMING |
|---|---|---|---|
| ORIGIN | MOST RECENT SCAN | SHAPE OF MAIL | SHIPPING SERVICES |
| ▸ TODAY - 4 ITEMS ~602 | | | |
| PITNEY BOWES<br>OMAHA, NE<br>JUNE 16 12:03PM | CHARLOTTE, NC<br>JUNE 16 9:13AM | LARGE ENVELOPE | FIRST CLASS MAIL<br>SIGNATURE REQUIRED |
| STEVEN A. SMITH<br>BRISTOL, CT<br>JUNE 14 2:43PM | WASHINGTON, DC<br>JUNE 17 7:18AM | ENVELOPE | PRIORITY MAIL |
| DWELL MAGAZINE<br>CHICAGO, IL<br>JUNE 14 12:03PM | WASHINGTON, DC<br>JUNE 17 10:08AM | CATALOG | FIRST CLASS MAIL |
| CB2<br>SAN JOSE, CA<br>JUNE 14 12:03PM | WASHINGTON, DC<br>JUNE 17 10:08AM | MAGAZINE | FIRST CLASS MAIL |
| ▸ TOMORROW - 3 ITEM | | | |
| STEVEN A. SMITH<br>BRISTOL, CT<br>JUNE 14 2:43PM | WASHINGTON, DC<br>JUNE 17 7:18AM | ENVELOPE | PRIORITY MAIL |
| PITNEY BOWES<br>OMAHA, NE<br>JUNE 16 12:03PM | CHARLOTTE, NC<br>JUNE 16 9:13AM | LARGE ENVELOPE | FIRST CLASS MAIL |
| CBS<br>SAN JOSE, CA<br>JUNE 13 12:03PM | WASHINGTON, DC<br>JUNE 17 10:08AM | CATALOG | FIRST CLASS MAIL |
| ▸ WEDNESDAY, JUNE 19TH - 7 ITEMS | | | |
| ▸ THURSDAY, JUNE 20TH - 10 ITEMS | | | |

SYSTEMS AND METHODS FOR CREATING AND USING A HYBRID-DIGITAL MAILBOX

CROSS REFERENCE TO RELATED APPLICATIONS

This application is a continuation of U.S. Nonprovisional application Ser. No. 13/618,897, filed Sep. 14, 2012, which claims the benefit of U.S. Provisional Application No. 61/535,686, filed on Sep. 16, 2011, and U.S. Provisional Application No. 61/618,329, filed on Mar. 30, 2012. The disclosures of the foregoing applications are incorporated by reference in their entireties.

FIELD

This disclosure is generally directed to systems and methods for creating and using a hybrid-digital mailbox and, more particularly, to systems and methods for creating, populating, and using a mailbox that includes information about physical mail in addition to electronic communications, and the functionalities associated with such a mailbox.

BACKGROUND

Recent advancements in the field of digital communications have resulted in a wide variety of alternative paths by which a user can receive information. In particular, advancements in electronic mail services and instant messaging services have diverted traffic away from traditional physical mail channels, as instantaneous communications have permanently changed the perceptions and behaviors of users with respect to communication. In 2010, broadband Internet penetration reached 80% and wireless web penetration reached 96% penetration. With the Internet's accessibility at such heights, users are increasingly turning to its convenience to manage all aspects of communications, financial transactions, and commerce.

The rapid proliferation of digital channels has resulted in a user experience that is segmented across a variety of different platforms. For example, the rapid evolution of social networking has changed how individuals manage their personal relationships and otherwise communicate with their network of friends, families, and business associates. The use of social networking sites has doubled from 26% in 2008 to 59% in 2011, and this trend has made digital technology central to how relationships are managed.

Similarly, digitization of bill presentment and payment, as well as other traditionally physical mail services, is becoming mainstream as more households are adopting these solutions in place of receiving physical bills. These advancements in digital bill payment processes have quickly cause a substantial increase in the number of online tools for marketing, retail, finance, and bill payments. Businesses are aggressively seeking ways to reduce costs, placing the emphasis on reducing paper statements by reducing the frequency of statements, utilizing new communication channels and consolidating communications across business units. It is estimated that mailers can actualize cost savings of 20% to 30% of overall operating costs based on a migration to digital mail, compared with traditional physical mail. Furthermore, governments that are facing deficits can use digital mailing techniques as a way to cut costs and address citizens' demands for greater transparency and communication.

The individualized digital services that have resulted from the movement from the physical to the digital has resulted in a user experience that can easily be overwhelming, as users must now keep track of communications arriving via the physical route, as well as a number of digital routes. Therefore, because of the increased importance of electronic communications, and because physical mail still plays an important role, it is desirable to introduce tools to allow users to universally integrate and centralize physical and digital aspects of communication, and to further add value to traditional mail by supplementing digital features to the physical mail experience and integrating convenient features with the added digital features.

This and other objects may be achieved by systems and methods for creating and using a hybrid-digital mailbox according to embodiments of the disclosure as described herein.

SUMMARY

In one example embodiment, a method for populating a calendar is provided. The method may include receiving tracking data regarding a delivery item. The method may further include calculating an expected delivery date for the delivery item. The method may also include identifying one or more deadlines associated with the delivery item, based on the tracking information, and automatically populating a user's calendar with the expected delivery date and the one or more deadlines.

In another example embodiment, an electronic device is provided. The mobile device includes a computer-readable storage medium storing instructions. The electronic device further includes a processor for executing the instructions to receive tracking data regarding a delivery item, calculate an expected delivery date for the delivery item, identify one or more deadlines associated with the delivery item, based on the tracking information, and automatically populate a user's calendar with the expected delivery date and the one or more deadlines.

In yet another example embodiment, a computer-readable storage medium is provided. The computer-readable storage medium stores instructions that, when executed by a processor, performs a method. The method may include receiving tracking data regarding a delivery item. The method may further include calculating an expected delivery date for the delivery item. The method may also include identifying one or more deadlines associated with the delivery item, based on the tracking information, and automatically populating a user's calendar with the expected delivery date and the one or more deadlines.

BRIEF DESCRIPTION OF THE DRAWINGS

Reference will now be made to the accompanying drawings showing example embodiments of this disclosure. In the drawings:

FIG. 4 illustrates an example graphical user interface of a hybrid-digital mailbox, in accordance with an example embodiment;

FIG. 5 illustrates another example graphical user interface of a hybrid-digital mailbox, in accordance with an example embodiment;

FIG. 6 illustrates another example graphical user interface of a hybrid-digital mailbox, in accordance with an example embodiment;

FIG. 7 illustrates another example graphical user interface of a hybrid-digital mailbox, in accordance with an example embodiment.

DESCRIPTION OF EXAMPLE EMBODIMENTS

Figure 1:
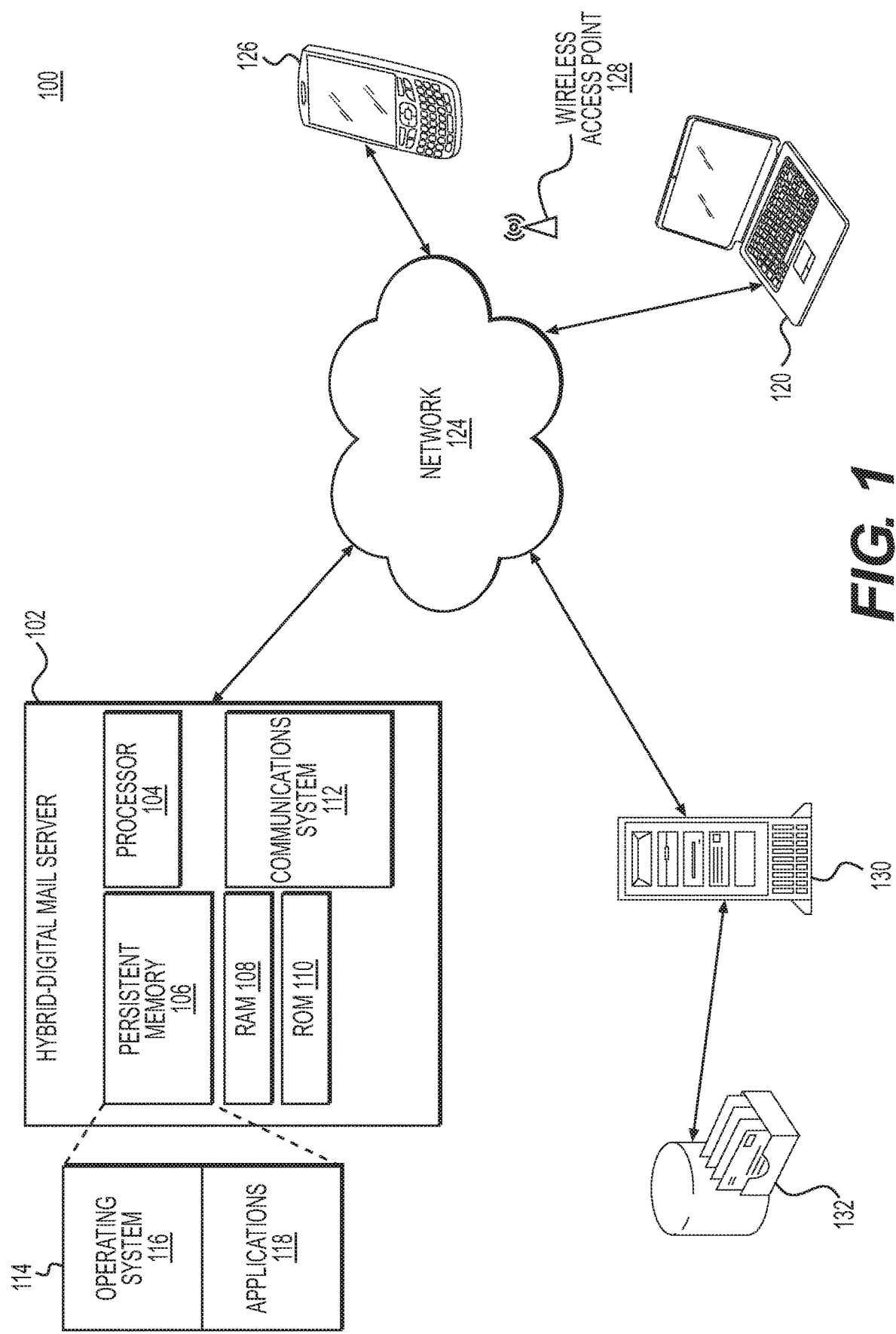
FIG. 1 shows, in block diagram form, an example system using a hybrid-digital mailbox.

The following detailed description refers to the accompanying drawings. Wherever possible, the same reference numbers are used in the drawings and the following description to refer to the same or similar parts. While several example embodiments are described herein, modifications, adaptations, and other implementations are possible. For example, substitutions, additions, or modifications can be made to the components illustrated in the drawings, and the example methods described herein can be modified by substituting, reordering, or adding steps to the disclosed methods. Accordingly, the foregoing general description and the following detailed description are example and explanatory only and are not limiting. Instead, the proper scope is defined by the appended claims.

In addition, numerous specific details are set forth in order to provide a thorough understanding of the example embodiments described herein. However, it will be understood by those of ordinary skill in the art that the example embodiments described herein can be practiced without these specific details. Furthermore, well-known methods, procedures and components have not been described in detail so as not to obscure the example embodiments described herein.

Example embodiments relate to using a centralized mail management platform that is secure and convenient for user. Such example embodiments may include implementation of a central dashboard for a hybrid-digital mailbox, whereby a user can visualize incoming and outgoing mail, both in electronic and physical form. Moreover, the dashboard may provide the ability for a user to view and track not only electronic mail, but also physical mail that is being delivered to the user, as well as outgoing physical mail being sent by the user.

Example embodiments may also allow a user to use features integrated with the hybrid-digital mailbox, such as greeting card applications, direct mail creation tools, bill payment, automatic updating of contacts, ordering of shipping supplies, printing postage, and complete calendar integration allowing alerts, reminders, and automated operations to be tied to various mail-events. Reference to "mail" within this disclosure can, for example, include both electronic mail, instant messaging communications, and physical mail pieces. Reference to "shipment" within this disclosure can, for example, refer to one or more delivery items.

Example embodiments may also include planning and recommendation tools integrated with the hybrid-digital mailbox that use historic mail delivery data to plan placement of mail in a mailstream and project campaign delivery dates. Recommendations on how to split the mail drop by location and drop days enable the user to achieve more synchronized delivery. Example embodiments may also allow a user to view historical mail campaign information and compare the tracking data of multiple campaigns.

The hybrid-digital mailbox centralizes access to an array of functionality associated with physical mail and digital mail through a user-friendly online interface. The hybrid-digital mailbox may also have integration of a variety of United States Postal Service (USPS) functions as well as functionality provided by vetted third-party services. Through the hybrid-digital mailbox, USPS customers can access an inbox and an outbox associated with physical mail as well as digital mail (email). The inbox view of the mailbox may allow users to view incoming mail and package items along with supplemental information about the received items. The outbox may allow users to view outgoing mail and package items that have been initiated through one of several mail and shipping creation tools that embed an identification marker, such as an Intelligent Mail Barcode (IMb) on the mail pieces. As the identified items are placed in the mail stream, information data associated with the item (e.g., an associated user identifier, a mail or shipping identifier, estimated delivery date, or location) can be recorded and provided for display in the outbox of the hybrid-digital mailbox.

Reference is now made to FIG. 1, which shows, in block diagram form, an example system 100 for implementing a digital-hybrid mailbox. The components and arrangement of system 100 as depicted in FIG. 1 may be varied. System 100 may include a hybrid-digital mail server 102, which may be implemented as a general purpose computer, a server, a mainframe computer, or any combination of such systems. Hybrid-digital mail server 102 may include a controller comprising at least one processor 104 (such as a microprocessor), which controls the overall operation of the hybrid-digital mail server 102. Processor 104 may interact with a variety of device subsystems, such as persistent memory 106, random access memory (RAM) 108, read-only memory (ROM) 110, and communication system 112.

Processor 104 can be a single microprocessor, or may be multiple microprocessors configured to execute computer-readable program instructions in a coordinated fashion. Such program instructions may be stored in a tangible non-transitory computer-readable storage medium such as a persistent memory 106, which may be a flexible disk, a hard disk, a CD-ROM (compact disk-read only memory), or other such persistent memory. Program instructions may also be stored in a computer-readable storage medium such as ROM 108, which may be any appropriate persistent memory technology, such as programmable read-only memory (PROM), electrically erasable programmable read-only memory (EEPROM), or Flash memory. These computer-readable storage mediums store the computer-readable program instructions for execution by processor 104 to perform a variety of functions on hybrid-digital mail server 102. Such computer-readable program instructions may be stored as software modules 114, for example, in persistent memory 106.

Software modules 114 may include operating system software 116, used to control operation of hybrid-digital mail server 102. Additionally, software modules 114 may include software applications 118 for providing additional functionality to the hybrid-digital mailbox. For example, software applications 118 may include a dashboard program that creates an interface allowing a user to view incoming and outgoing physical mail and electronic mail. Software applications 118 can further include a range of applications including, for example, a physical mail tracking program that allows a user to print an IMb on a piece of mail and use the IMb to track the mail piece and report the arrival of the mail piece to a recipient; an advertisement program that allows a business to create digital mail campaigns to augment a physical mail campaign; a software application interface that allows additional tools to be added to the mailbox; a calendar program that notifies the user of mail-related events (such as birthdays and anniversaries) and allows the user to initiate mailings based on the events; and an integrative support program that links programs to a common database, provides a common user interface, performs basic bookkeeping tasks, (such as controlling access to the mailbox, storing address book and calendar information, etc.), and provides user guidance and help. Memory 123 may also include other programs that perform other functions and processes, such as programs that provide communication support, Internet access, etc. Functionality associated with such example software modules will be described in greater detail below.

Hybrid-digital mail server 120 may be communicatively coupled to one or more client devices 122 via a wide area network (WAN) 124, such as the Internet. Client device 122 may be any type of computing device, such as a laptop or desktop computer, and may include a processor (not shown) capable of executing software modules for connecting client device 122 to network 124. For example, client device 122 may execute a web browser application to communicate with hybrid-digital mail server 102. Hybrid-digital mail server 102 may send data representing a hybrid-digital mail interface to client device 122 via network 124, and client device 122 may display the received data to provide a user of client device 122 with access to the functionality associated with software modules 114. In some embodiments, hybrid-digital mail server 102 may render a hybrid-digital mail interface, and the generated mail interface may be transmitted to the web browser on client device 122 for display. In other embodiments, hybrid-digital mail server 103 may send data used to generate the hybrid-digital mailbox interface to client device 122, where the interface is locally rendered on client device 122.

System 100 can include one or more mobile devices, for example, mobile device 126, used for connecting to the hybrid-digital mailbox. Mobile device 126 may include devices such as a smart phone, PDA, tablet, or on-board vehicle computer system. Mobile device 126 can include devices equipped for cellular communication through cellular mobile networks, or mobile devices equipped for Wi-Fi communications over, for example, a wireless local area network (WLAN) via wireless access point 128, or dual-mode devices capable of both cellular and WLAN communications. Wireless access point 128 can be configured for coupling with WLANs that operate in accordance with, for example, IEEE 802.11 specifications. Mobile device 126 can be, for example, a cellular phone, smartphone, tablet, netbook, or PDA (personal digital assistants) enabled for wireless communication.

Hybrid-digital mail server 102 may also be communicatively coupled to one or more data repositories 130, e.g., through network 124. Data repository 130 may include one or more files or databases that store information and are accessed or managed through hybrid-digital mail server 102. The files or databases may include, for example, data and information related to incoming or outgoing physical or electronic mail, address book contacts, system and user preferences settings, calendar events, or mail campaigns.

Data repository 130 may also receive data from one or more mail processing systems 132 associated with a mail distribution network (e.g., the USPS). Mail processing system 132 may perform a variety of processing functions, such as mail sorting, processing, labeling, and scanning of incoming and outgoing physical mail pieces. Mail pieces that are transported along the mail distribution network may have identifying barcodes, such as an IMb which can serve as a tracking code to enable the postal authority to ascertain certain events related to the physical mail piece. Based upon address identifying features within the IMb, inbound physical mail pieces will be identified as they are processed by mail sorting equipment and the mail piece processing information will be forwarded to a centralized database, or to data repository 130. Mail piece processing information forwarded to the databases may then be analyzed for information about the location of a mail piece at time of processing, type of mail, sender, processing operation, and destination. The analyzed information may then be forwarded to data repository 130 for use by hybrid-digital mail server 102, and for use in the hybrid-digital mailbox for presentment to a subscribing user.

Data repository 130 may also retrieve and store user address information for purposes of authenticating or validating mailing addresses received in connection with use of hybrid-digital mail server 102, such as for validating a correct entry of an address by comparing the address to USPS master address databases. Mail processing system 132 may also include other mail processing equipment, and may be located at one or more mail processing facilities.

Figure 2:
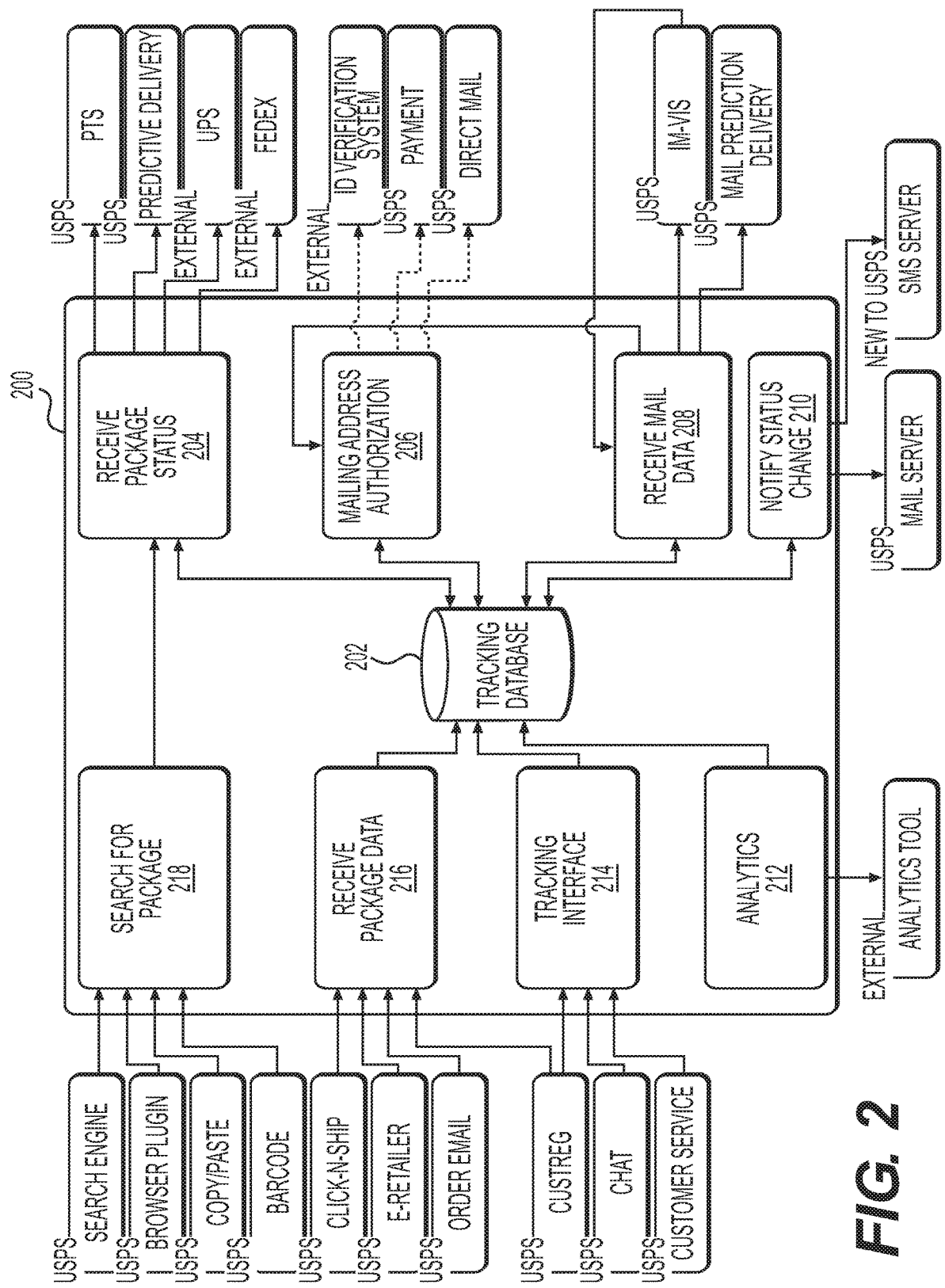
FIG. 2 is a data flow diagram of an example hybrid-digital mailbox in accordance with an example embodiment.

Reference is now made to FIG. 2, which is an illustration of data flow between a tracking system 200 and a variety of systems, subsystems, or modules used in the tracking and gathering of data for use by tracking system 200 in the overall hybrid-digital mailbox. The various systems depicted in FIG. 2 may be implemented as systems stored and executed on hybrid-digital mail server 102, such as by software modules 114, or may be systems stored and executed on data repository 130. The systems, subsystems, and modules depicted in FIG. 2 provide a variety of data extraction and importation functionality allowing a user of the hybrid-digital mailbox to visualize the mailing process by aggregating all inbound and outbound mail and package data, and storing such data in a tracking database 202.

Tracking system 200 may contain a Receive Package Status module 204 which may access additional subsystems to determine appropriate informational status with respect to packages. Receive Package Status module 204 may access a variety of subsystems or external systems to receive package data, such as a USPS Product Tracking System (PTS), which may provide scanning information corresponding to packages shipped via USPS. Receive Package Status module 204 may also access a predictive delivery system, which may allow tracking system 200 to predict the appropriate delivery date for a package in shipment based on information regarding the package, such as information received from the PTS.

Receive Package Status module 202 may also access external package shipment carriers, such as UPS® or FedEx®, to determine the appropriate status of packages being shipped by the external carriers. Such information may be obtained, for example, by issuing a call to APIs associated with the shipment carriers, and receiving data based on the API call corresponding to the requested data. The received data can then be stored in tracking database 202.

Tracking system 200 may also contain a Mailing Address Authorization module 206, which may be used to register and verify a user's authenticity and associate a particular user with a mailing address. For example, as part of a registration process, a user may be authenticated by the USPS and provided with a unique user ID. This may enable secure, private access to mail information associated with the user ID. During the registration and authentication process, users may establish a profile of addresses, and may be able to identify his or her home street address as well as any PO Box addresses he or she has with the USPS. The registration and authentication process may link the user's physical address(es) and user ID with one or more email addresses in the user's profile. Based on the linking of email addresses and physical addresses, the hybrid-digital mailbox can associate incoming physical mail and electronic mail with a common mailbox.

Authorization and linking of physical addresses and user IDs may be performed according to a variety of processes. For example, Mailing Address Authorization module 206 may access an external ID verification systems, such as Equifax®, to present the user with a series of authorization questions to ensure the user's identity. Based on the responses received by the external ID verification system, the user ID and any email addresses can be associated with a particular address. A user's address may also be linked to a particular user ID by accessing a USPS database associated with prior payment information received from the user. For example, if the user has previous registered for a USPS online store account, and has entered a billing or shipping address, an appropriate address may be linked with the registered user ID. Alternatively, a user may also authorize a particular physical address via a direct mail option, whereby a user may receive a physical piece of mail, and may associate the physical piece of mail with a particular user ID by going to a USPS store and performing an in person validation.

In alternate embodiments, the user may perform authorization of their mailing address by variations of the direct mail option. For example, the user may receive a piece of physical mail with an IMb containing an embedded token associating a user ID with the physical mail. Upon receipt of the physical mail, the user may scan the IMb with a scanning or picture device, such as a scanner, webcam, or camera. The information can then be uploaded to the hybrid-digital mailbox and provided to Mailing Address Authorization module 206 for verification of the address. Moreover, the physical mail piece may be tracked during shipment to the physical address, such that it can be verified that the physical mail piece was not diverted.

In an alternate embodiment, the user may be sent a physical mail piece, and may also receive an email having a particular authorization code contained within the email. The physical mail may contain a return mail piece printed with a corresponding 1 Mb linking the return mail piece to the user's ID, and the user will be requested to send the return mail piece back to the USPS. The user may also be required to include the authorization code on the return mail piece that was only contained in the email. If the return mail piece is returned within a set time period, and the information contained in the return mail piece matches the information contained in the validation email, validation is completed and the addresses are linked.

In another embodiment, the user of the hybrid-digital mailbox may print a mailing label directly from the mailbox associated with the user. As such, the mailing label will be associated with a particular address and user ID. The user may then place the label on a piece of physical mail and place the mail into the mailstream, whereby the mailpiece will be scanned and the sending address and user ID can be associated with one another and authorized.

Tracking system 200 may also include a Receive Mail Data module 208, which may access a data broker system such as an Intelligent Mail Visibility (IM-VIS) system to filter and extract information pertaining to a particular user ID or delivery point. The IM-VIS system may receive data which has been extracted from one or more mail processing machines, databases, mail pieces, or other sources of data, such as by mail processing system 132. For example, information regarding incoming or outgoing mail pieces may be extracted from a manifest such as a mail.dat file, may be extracted based on scanning equipment which scans all incoming and outgoing mail pieces at a processing facility, or may be extracted based on mail-piece images generated using mail processing equipment with imaging capabilities. The imaging may include imaging a single side or face of mail pieces, or may include imaging multiple sides or faces of mail pieces. These images of the mail pieces may be processed to extract identifying information regarding the mail pieces by use of indicia such as an IMb. Mail pieces may include letters, flats, packages, or other mailed items. The extracted data may then be provided to the IM-VIS system, which may receive data associated with mail pieces processed by multiple processing facilities.

The stream of extracted data received by the IM-VIS system may then be brokered to a subscribing system or application, such as tracking system 200. Using user ID information associated with the hybrid-digital mailbox, Receive Mail Data module 208 may filter though the extracted data and determine data appropriate for a particular delivery point or user ID, using a variety of IM-VIS codes. For example, Receive Mail Data module 208 may access a user profile to determine an appropriate address corresponding to a user ID associated with the hybrid-digital mailbox. Based on the address, Receive Mail Data module 208 may issue a request to IM-VIS for any data associated with the delivery point associated with the address by use of IM-VIS field codes, thereby determining all delivery items designated that should be associated with the user ID, and therefore displayed in the hybrid-digital mailbox. This user delivery point data can then be filtered out, and the filtered user delivery point data may be used by tracking system 200 of the hybrid-digital mailbox to determine all relevant information concerning one or more mail pieces corresponding to a particular user's account, or corresponding to a particular delivery point associated with the user's account, such as a P.O. Box, a house, or specific condo or apartment within a building.

Therefore, using a variety of identifying information associated with the mail piece, such as IM-VIS fields, Receive Mail Data module 208 may identify a particular delivery point, and may filter through a variety of mail data received at multiple processing facilities to focus on the particular delivery point, thereby obtaining access to information regarding delivery items designated to be shipped to or from the particular delivery point. This information may then be provided to tracking system 202, for use by the user's hybrid-digital mailbox.

In certain embodiments, a mail piece may not yet have been processed at a mail processing facility, and data relevant to the mail piece may only be based on the generation of an IMb from a sender's hybrid-digital mailbox. In this instance, IM-VIS would not contain any information pertaining to the mail piece, and the filtering of data according to delivery point would not contain the mail piece. In these instances, a mail prediction delivery system may calculate a predicted delivery date based on identifying information associated with the mail piece, such as the IMb generated for the mail piece. Therefore, Receive Mail Data module 208 may also receive prediction information concerning pending delivery items, and may provide this information to tracking system 202 for use by the user's hybrid-digital mailbox.

Tracking system 202 may also contain a Notify Status Change module 210, which may be used to provide notifications to a user based on the status of a particular package of mail piece. For example, based on information stored in tracking database 202, Notify Status Change module 210 may determine that a certain shipment is designated for delivery at a delivery point within 24 hours. A notification may then be generated and issued to contact information associated with the delivery point by determining the appropriate user ID associated with the delivery point. For example, Notify Status Change module 210 may issue an alert to provide a notification on the interface of the hybrid-digital mailbox corresponding to the user ID. In another embodiment, Notify Status Change module 210 may access user profile information associated with the user ID to obtain an associated email address, and may provide a status email to the user at the email address. Alternatively, an SMS text message may be provided to the user using account information on file, via an SMS server.

In another embodiment, Notify Status Change module 210 may provide daily notifications to a user. For example, a user may receive an email or text message having a daily or weekly digest of what packages to expect, such that the user can determine appropriate times to be at the intended delivery point to receive the shipment.

Tracking system 202 may include an Analytics module 212 that may be used to generate statistics associated with overall tracking of mail pieces by tracking system 202. In certain embodiments, Analytics module 212 may also generate statistics corresponding to a particular user's hybrid-digital mailbox, which may be used to adjust or tune certain functionality associated with the particular user. For example, a notification period used by Notify Status Change module 210 may be adjusted based on the frequency of delivery items received at a particular user's hybrid-digital mailbox. In certain embodiments, the statistics may be generated by an external analytics tool, such as the Google Analytics™ web analytics service, or Webtrends Analytics™.

Tracking system 202 may include a Tracking Interface module 214 that may interact with a user interface of the hybrid-digital mailbox to provide data regarding delivery items to a user. Tracking Interface module 214 may access tracking database 202 based on a request by the hybrid-digital mailbox, and may gather appropriate information for displaying on a user interface of the hybrid-digital mailbox. Features of the user interface of the hybrid-digital mailbox will be discussed in greater detail below. Tracking Interface module 214 may also interact with USPS systems to assist a user of the hybrid-digital mailbox with certain tasks. For example, Tracking Interface module 214 may automatically access customer registration information associated with the hybrid-digital mailbox that is stored in USPS servers, or may interact with various support services, such as customer service applications or chat software, to provide assistance to a user of the hybrid-digital mailbox via the user interface. For example, based on a request for help concerning a shipment entered by the user on a user interface of the hybrid-digital mailbox, Tracking Interface module 214 may automatically provide shipment data from tracking database 202 to the customer service applications or chat software. Such interaction between Tracking Interface module 214 and support services may save the user time and effort in providing shipment details to a customer representative.

Tracking system 202 may include a Receive Package Data module 216 that may automatically receive, extract, and store various package data associated with a user of the hybrid-digital mailbox. For example, if a user generates a pre-paid shipping label via the hybrid-digital mailbox using an integrated Click-N-Ship application, shipment information corresponding to the label may be automatically entered into tracking database 202 for use by the hybrid-digital mailbox. In certain embodiments, a user may purchase a product from an electronic retailer, and information concerning the product may be automatically provided or extracted by Receive Package Data module 216. For example, a user may purchase products from Amazon®, and upon shipment of the purchase, Amazon® may push shipment information to Receive Package Data module 216 for entry into tracking database 202. Alternatively, a user may receive a shipment notification email from an electronic retailer, and the user may forward the shipment notification email to Receive Package Data module 216, which may then extract shipment data, such as a tracking number, from the email, and store such data in tracking database 202 for use and display in the hybrid-digital mailbox.

Tracking system 202 may include a Search for Package module 218 that may interact with various systems to receive tracking identifiers, such as a tracking number, and access Receive Package Status module 204 to determine the appropriate status of a package. For example, Search for Package module 218 may interact with a search engine, whereby a user who searches for a tracking number may be provided a link on a page returned by the search engine, and by simply clicking the link, a request can be issued to Search for Package module 218 to request shipment data regarding the tracking number. In another embodiment, a browser plugin may be provided for interacting with Search for Package module 218, whereby a user may right click a tracking number in a browser, and functionality associated with Search for Package module 218 may be provided within the browser. Alternatively, Search for Package module 218 may provide the ability for a sender to track information regarding a package they have sent, and the sender may enter tracking information via copy/pasting the tracking number, or scanning a barcode associated with the tracking number.

Figure 3:
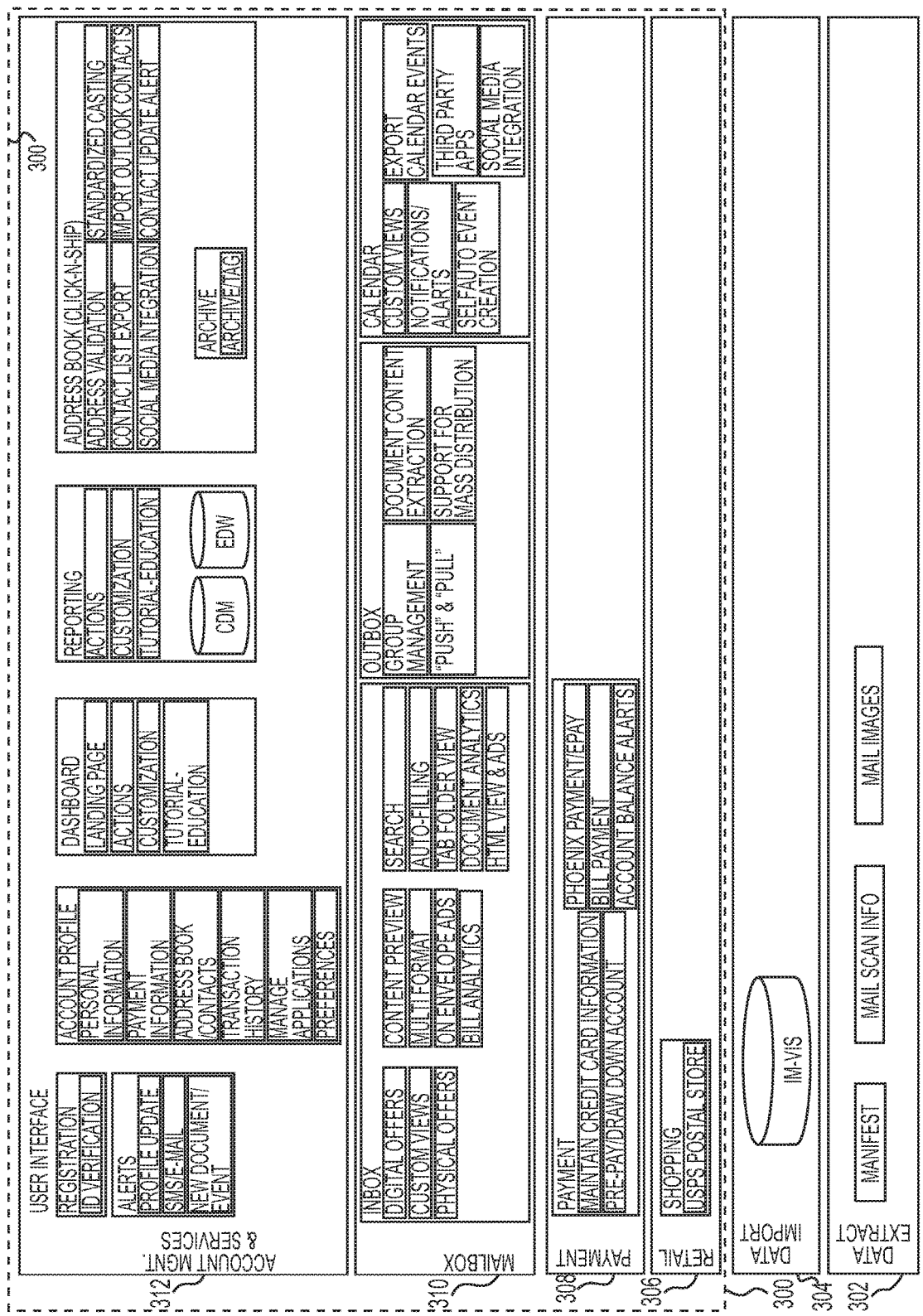
FIG. 3 illustrates conceptual layers of a user interface of an example hybrid-digital mailbox, in accordance with an example embodiment.

Reference is now made to FIG. 3, which illustrates different conceptual and organizational layers for the hybrid-digital mailbox, including an example user interface 300. The conceptual and organizational layers of the interface may include a data extract layer 302, a data import layer 304, a retail layer 306, a payment layer 308, a mailbox layer 310, and an account management and services layer 312.

Data extract layer 302 and data import layer 304 perform functionality described above with reference to Receive Mail Data module 208. That is, shipping information is extracted from incoming and outgoing mail pieces using a variety of methods, such as manifests, scanning of mail pieces, and capturing of mail images. The extracted data is then provided to the IM-VIS system in data import layer 304, and the extracted data may then be brokered to a subscribing system or application, such as tracking system 200.

Retail layer 306 may include a shopping module integrated with the hybrid-digital mailbox. The shopping module may provide services for purchasing a variety of mailing related supplies, and for conveniently placing orders via integration with the hybrid-digital mailbox user interface. Retail layer 306 may provide relevant services through an online postal service, such as the USPS Postal Store. A user may also have access to their order history, and may specify that a certain order is periodically undertaken automatically, such that certain shipping supplies are received in a periodic manner. For example, a user may specify via the shopping module that an order for envelopes should be automatically entered every three months, and the shopping module may undertake processing to automatically purchase the envelopes using payment information associated with the user.

Payment layer 308 may include programs for enabling payments related to the hybrid-digital mailbox. For example, payment layer 308 may include a database storing user payment information, such as credit card information associated with a user, or a pre-paid account by which funds can be drawn against. Payment layer 308 may allow a user to establish that fees associated with postage and other value added services may be paid through the user's "draw down" account linked to the user's credit card, PayPal or other payment account. A minimum dollar value to pre-load into this account may be set. This allows the user to purchase on a transactional basis any fee-based features of the mailbox without having to pay micro-payments each time. The account balance may be displayed on the homepage of the customer's account. Payment layer 308 may also interact with programs which provide functionality for electronic payment services for bills, balance alerts, or notifications to users.

Mailbox layer 310 may include programs or modules for providing functionality related to inbox, outbox, and calendar services. The inbox may include programs related to digital offers, custom views, physical offers, content preview, and may provide searching, filing and analysis functionalities, and may interact with Tracking Interface module 214 of FIG. 2. Through interaction with Tracking Interface 214, the inbox may receive information feeds from Receive Package Status module 204 and Receive Mail Data module 208 allowing tracking data to be displayed.

The inbox may include a listing of physical mail (a physical mail portion) and a listing of digital mail (a digital mail portion) received by the mailbox, allowing a user of the mailbox to view all incoming physical mail pieces and packages destined for the user's address, alongside any emails received at the user's email address associated with the user's physical mailing address on a single interface. The listing of the physical mail may be sorted by the type of mail, the sender of the mail, the subject of the mail, the expected or actual delivery date, or the status of the delivery. The listing of the mail may also be filtered according to predefined filters associated with the mail, such as filtering by type of mail, sender, or date range.

The physical mail may also include an image or a link to an image of the mail. The image may be taken from a postal service machine that scans the mail as it is processed and sorted at a postal service processing facility. The type of mail piece, the sender, the subject, and the expected delivery date may be obtained in a number of ways. As described above, the inbox may access information in tracking system 200, such as by use of Receive Mail Data module 208, which is capable of filtering IM-VIS shipment data. In another embodiment, the information may be manually entered by the recipient in the recipient's hybrid-digital mailbox. In another embodiment, the information may be partially populated by the manifest file, and completed by the recipient.

The inbox may include a status section indicating the status of mail that has been received. In some cases, the status may indicate a warning or an error. The system may use logic to interpret the warning or error to report an understandable result to the sender. For example, the error may be due to the fact that a signature will be required at delivery. In this case, the error message may reflect that an upcoming shipment requires a signature. In other situations, the mail may be delayed in transit for one or more reasons. In these cases, the error message may reflect this fact.

The digital portion of the inbox may include similar information regarding the digital mail, for example, the type of mail, the sender of the mail, the subject of the mail, and the actual or expected delivery date. The digital portion of the mailbox may also include a link to electronic content, such as a PDF or a website link. The PDF may be hosted by a specific organization, such as the USPS, for security reasons. For example, before making the PDF available, the hosting organization may scan and certify the PDF. Similarly, the hosting organization may verify that the website link directs the recipient to an appropriately secure website, and may periodically confirm that the website is a safe or secure website.

The inbox may also provide the option of prioritizing mail associated with a certain type or sender. For example, a user of the hybrid-digital mailbox may have a preference for mail received from a certain sender, such as a parent, and may therefore set a priority via a user profile preference for types of mail from a parent's address. The inbox may then, for example, assign a particular priority location in the mailbox for any mail associated with a priority sender. The inbox may also issue an alert to the user via interaction with Notify Status Change module 210 to provide the user an indication that a high priority mail item has been received. In certain embodiments, a mail piece may have an option for providing feedback regarding content of a mail piece. For example, if a user receives a particular mail piece from a certain online retailer, and the user determines that there is continued interest in this online retailer, the user may select a "like" feature for the particular mail piece. Based on this feedback, the inbox may assign a high priority to similar mail received in the future.

The inbox may also be tied to a digital advertising program, which may provide users with the ability to view supplemental related content or bonus offers from third parties associated with the physical mail piece. This supplemental content feature may be tied to a restricted advertising program implemented by a mail service, such as the USPS, thereby limiting the amount of advertisers to those expressly permitted, or those companies that have completed an application process. Advertising companies may be offered the ability to attach targeted offers to users linked to the physical mail that will be displayed in the digital inbox. Advertisers may also have tools to customize their campaign to users. Supplemental content may be a variety of types of content, such as physical content, or electronic content such as a video file, an audio file, a graphical file, or a link to online content such as a webpage.

Any supplemental content, such as offers ("ads"), may be provided as digital ride-a-longs for mail items that appear in their digital mailbox inbox. These ads may be presented as bonus offers because they are associated with a physical mail or package item in the user's inbox. Once a user clicks on the appropriate icon to view the ad, he or she may view a digital ad presented through an interface window of the hybrid-digital mailbox to view the ad. Any call to action embedded with the ad may or may not direct the user off of the hybrid-digital mailbox (outside of USPS property).

The supplemental content feature can be made possible through an advertising brokerage program. This program may be restricted to traditional mailers who have mail or packages in the mail stream. The mailer may be allowed the option of adding a digital ad as a component of their multi-channel marketing efforts. Mailers may be allowed to apply for acceptance into the Ad Program. The Ad Program may be managed through an administration panel accessible by the approved mailers. Scheduling of mail/package entry into the USPS physical mail network may be linked to the Ad Program to enable coordination of timing between the physical mail and the supplemental offers. The entire ad campaign may be managed through an administration panel including creation, scheduling, target audience and back end analytics.

The recipients of the supplemental offers may be selected by geographic region. For example, the ad sender may select specific zip codes or other geographic limitations near the sender's place of business for the advertisements to be sent. The sender may also select recipients based on other criteria, for example, specific preferences of recipients that should receive the advertisement. For example, if the sender is a sports store, the sender may request that the advertisements be mailed to a specific number of individuals who have indicated an interest in sports or specific sporting activities. In this case, the recipients may have updated a preferences section of their hybrid-digital mailboxes to indicate preferences, such as hobbies, likes and dislikes, interests, occupation, and other personal information and preferences.

The sender may also decide whether to send the supplemental content by physical mail, electronic mail, or both. When placing the order for sending of supplemental content, the sender may include information regarding the supplemental content to be mailed. This information may be included in a manifest file. The information may include, for example, the number of mailings, the type of mailings, the postage, the name of the sender, the name of the recipients, and other personal information. When physical mail is selected, the supplemental physical mail can be scanned and notifications may be delivered to the sender and the recipients regarding the supplemental mailing.

When physical and electronic is selected, the supplemental physical mail may again be scanned when processed. However, in addition to notifying the recipient that physical mail is in transit, the system may, at this point, notify the recipient that supplemental electronic mail is in transit. The supplemental electronic mail may be an electronic version of the physical mail being sent to the recipient. Once the physical mail piece is processed at a postal service processing facility, information regarding the physical mail piece, such as a type of mail piece, and tracking information, may be provided to the hybrid-digital mailbox. Using such information, the hybrid-digital mailbox may determine that appropriate electronic content, such as a coupon, should be delivered along with the physical mail piece, and the hybrid-digital mailbox may automatically schedule delivery of the electronic content to coincide with the physical mail piece, based on the received tracking information. Alternatively, the electronic mail can be made available on a specific date, be made immediately available to the recipient, or be made available at another appropriate time. In certain embodiments, a second physical mail piece containing the related content or bonus offer may be scheduled to be delivered at or around the same delivery date.

The supplemental electronic mail may include electronic media related to the physical mail being sent. For example, if the physical mail is a magazine, the electronic mail may include a link to the magazine's website. If the physical mail is an advertisement, the electronic mail may include a special code for additional discounts. For example, coupons for furniture at a retail store can be associated with a physical print catalog mailed by the retail store, and the user can therefore receive electronic versions of the coupon via email for viewing in the inbox.

If the sender selects electronic only mail, the electronic mail may be queued to be sent on a specific date. Alternatively, the mail may be immediately sent. Recipients of the mail may receive notification that electronic mail has been received or will be received on a specific date. This notification may appear in the recipient's inbox or calendar. Additionally, when time sensitive electronic mail is sent, the sender may have the option to delete the electronic mail from a recipient's hybrid-digital mailbox if a time sensitive event has passed and the email has not been opened. Similarly, in the physical and electronic mail example above, if the physical mail is received after the time sensitive date has expired, the system may not send the notification of the supplemental electronic mail to the recipient, and may also not make the electronic content available.

In certain embodiments, when the recipient receives the physical mail, the recipient may scan the physical mail, for example, via a webcam, or other such device capable of recognizing identifying features of the physical mail, such as the IMb. Based on processing the scan, the hybrid-digital mailbox may prompt the delivery of supplemental content. In certain embodiments, scanning the 1 Mb may result in the display of the supplemental content to a user.

The delivery of supplemental content may also be available to consumers, rather than mailers accepted into the Ad Program. For example, a sender of a delivery item may request a tracking identifier, such as an IMb, be generated for a delivery item. The sender may then browse for supplemental content to be associated with the delivery item, such as by browsing for a particular graphical file on a local hard drive. Upon selecting the supplemental content, the delivery item may be associated with the supplemental content, and this association may be stored in one or more databases.

Moreover, additional security may be provided by the hybrid-digital mailbox to avoid abusive spam mailings by consumers. For example, the hybrid-digital mailbox may allow only those consumers who have received a delivery item from a certain delivery point in the past to send supplemental content to that delivery point. Such security measures would prevent an individual from performing unauthorized advertising while simultaneously circumventing the strict requirements of the Ad Program.

Users may also be able to manage the mail items and notifications in the inbox including archiving mail, separating mail into folders, or deleting mail. Users may be able to manage delivery of items in the inbox including rerouting of mail to an alternate address, expediting the delivery of mail, intercept and place mail on hold for pick up at a Postal facility, or other such delivery options.

The outbox may include a similar display as the inbox, but pertains to messages sent by the user of the mailbox. The outbox feature may allow users to view where their outbound mail is in the mail stream. This is made possible by the connection of mail and shipping creation tools with the outbox. For example, a user may create a mailing label with a tracking barcode by easily clicking a "Create Mail" or "Create Package" button associated with the outbox, resulting in the generation of a tracking barcode for the shipment. The user may also receive a notification of the estimated costs associated with the shipment. Once the tracking barcode is attached to a piece of mail and dropped in the mailstream, the user may receive notifications of the delivery status via the hybrid-digital mailbox as the shipment is scanned along the mailstream. Available data for any mail piece or package may include type, recipient(s), estimated delivery date, quantity, delivery progress (specific categories), delivery alerts as well as full piece level detail. Users may manage the items in the outbox through archiving, folder creation, deletion, or other such functions.

The outbox may be integrated with existing USPS databases and mail processing equipment to send and receive information feeds to support the outbox functionality, such as by interacting with tracking system 200. Based on the received information feeds, indicators may be provided in the outbox to inform a sender of the status of the mail sent. For example, the outbox may display progress bars depicting that the mail is in transit to a recipient, or has been delivered to the recipient.

The outbox may include a status section indicating the status of mail that has been sent. In some cases, the status may return an error. The system may use logic to interpret the error to report an understandable result to the sender. For example, the error may be due to the fact that the recipient has moved. In this case, the error message may reflect that the recipient has moved. In other situations, the mail may be undeliverable for one or more reasons. In these cases, the error message may reflect this fact.

The calendar associated with mailbox layer 310 may include programs related to custom views of incoming and outgoing mail, notifications and alerts concerning mail received or currently in transit, management of events or milestones, social media integration, and exporting calendar events. The calendar may also communicate with, or be integrated with, third party applications for providing additional functionality associated with certain events or milestones. The calendar may be integrated with existing USPS databases and mail processing equipment to send and receive information feeds to support the calendar functionality. For example, the calendar may send and receive information feeds to/from existing Mail-N-Track systems for tracking mail location, estimated delivery, delivery status, and other related tracking information.

The calendar may be displayed, for example, as a monthly calendar showing each day and the amount of physical or digital mail received or expected to be received on that day. The calendar may also indicate or provide information regarding any tracking data for mail that has been sent or is expected to be received either previously or in the future. For example, if a letter is scanned at a post office processing facility, the calendar may interact with Receive Mail Data module 208 to acquire delivery information regarding the mail. Then, the recipient may receive a notification that a piece of mail is expected to be delivered in the next few days. The expected delivery date may be calculated and a notification may be placed on the calendar on the expected delivery date, indicating that a piece of mail is expected to be received on that date. For example, because the mail is a physical piece of mail the physical mail identifier may indicate that one piece of physical mail is expected on the given day. Similarly, if electronic mail is intended to be delivered on a specific date, that may be represented on the calendar. Additionally, if a piece of physical mail is scanned and the IMb indicates that the piece of physical mail is associated with supplemental content, such as a piece of electronic mail, the calendar may indicate that both a piece of physical and a piece of electronic mail are anticipated to be delivered on the expected delivery date.

The calendar may also be used for scheduling events such as birthdays, anniversaries, or other dates, which may be used by the mailbox to provide reminders or automatically send appropriate electronic communications or greeting cards on a periodic basis. In certain embodiments, the calendar can be linked to the user's social graph (e.g., Facebook, LinkedIn®, etc.) to link or import events or milestones to the mailbox. By activating alerts for any event or milestone that appears on the calendar, the user may be seamlessly linked with a variety of shipping creation tools to send mail based on the event or milestone (i.e., to send anniversary or birthday cards).

The user may also manage the scheduling of deadlines on the calendar based on inbound mail. For example, an incoming bill for a utility company may specify a specific date by which the bill must be paid, and the deadline for paying of the bill can be automatically added to the calendar. The calendar can also automate mailing activities in anticipation of certain deadlines placed on the calendar. For example, the calendar may automatically create a mailing label and print postage seven days prior to a payment due date, providing a convenient mailing experience for the user.

Various aspects of the hybrid-digital mailbox, such as the inbox, outbox, and calendar, may be linked to a USPS software application catalog. This catalog may be comprised of tools developed by the USPS as well as third parties. These applications, once downloaded to a user's mailbox, may add features and functionality not available with a basic mailbox. Once an application is downloaded, the associated icon will appear in the user's mailbox. The appearance of the app in a user's mailbox may activate the associated functionality for the user. Users may be able to easily link to/from the application catalog from the mailbox.

Third party applications may be provided through a developer program that will allow third party software developers to apply for participation in this program, and create applications for use in the hybrid-digital mailbox system. These third party applications may be governed by strict design guidelines established by the USPS, ensuring that any third party applications meet certain standards for usability and performance. The third party applications may be tested and authenticated before being made available in the application catalog to ensure no security violations or complications occur as a result of the downloading and use of any third party applications.

Types of applications available in the catalog may be limited to those that are mail and shipping related. Examples of categories of applications include applications such as a greeting card related application that integrates with the user's inbox, outbox, and calendar. Such an application may allow a user to access an inventory of greeting cards of all types, customize those cards digitally, add supplemental items such as gift cards, and submit them to be printed offline by a professional or to be printed at home. In certain embodiments, greeting cards or other such mailings may be generated based on action data contained in the user's calendar, and via interaction with the greeting card application, a greeting card may be automatically generated and printed for physical mailing, or emailed. A user may then track the delivery progress via their outbox dashboard.

A second example of categories of applications include applications such as a bill presentment and payment application. Such an application may allow a user to have digital versions of their bills presented to them through the inbox. Upon selecting the associated link from the inbox dashboard, the user will be allowed to see a full digital version of their complete bill statement from select billers. Using the application, the user may then be allowed to pay that bill by selecting the appropriate option and linking to the payment gateway of choice. The payment process may use a user's payment profile information managed by payment layer 210. The payment process may then contact payment servers external to the hybrid-digital mailbox system. Upon completing this transaction, data about that payment may be fed back to the user's digital mailbox account for personal management.

In an alternate embodiment, the catalog may provide access to various APIs of social media websites. For example, the catalog may provide a intermediary application which may allow API calls to pass between the hybrid-digital mailbox and an external social media website. Thus, by logging into the appropriate social media website, the user can conduct mailings or retrieve mail data from within the social media website by use of the intermediary application associated with the hybrid-digital mailbox.

Account management and services layer 312 may include programs or modules for providing functionality related to registration, user authentication, alerts, account profiles, control of the dashboard, mail reporting, management of the address book, and archiving services. The registration services may provide an ID verification user interface for interacting with Mailing Address Authorization module 206 of FIG. 2. Additionally, the visual interface may enable a user to specify permissions associated with the mailing address. For example, in situations where more than one occupant lives at a single address, permissions can be provided such that only certain viewing activities of the interface may be provided, and additional authentication may be required to access the full functionality of the hybrid-digital mailbox depending on permissions associated with a user ID.

The alerts services may be integrated with Notify Package Status Change module 210 of FIG. 2, and may include programs related to profile updates, SMS and email notifications and alerts, and new document or event alerts. Such alerts services may be tied to the calendar of the hybrid-digital mailbox, and alerts can be provided based on events placed on the calendar. The account profile services may include programs related to personal information, payment information, address book and contacts, transaction history, application management, and preferences. The payment information may link the user's account with payment information managed by payment layer 304.

The dashboard of the hybrid-digital mailbox may provide services including programs related to a landing page for users, and functionality associated with inbound and outbound mail summary screens. Via the landing page of the dashboard, a user of the hybrid-digital mailbox may perform a wide variety of actions. An example illustration of the dashboard is depicted in FIG. 4. For example, the dashboard may display an overall view 400 of the hybrid-digital mailbox, display an inbox portion 402, and an outbox portion 404. Such inbox and outbox portions may be displayed upon selection of mailbox option 406. Additional options may be presented on the dashboard, such as an option to select applications downloaded from the USPS software application catalog 408, an option to select the user's address book 410, and an option to select a user's calendar 412. The dashboard may also contain a shipping supplies ordering option 414, and an option for viewing offers received based on incoming or outgoing mail 416. In certain embodiments, the dashboard may contain a mailing labels section allowing a user to generate mailing labels from addresses in an address book associated with the user's mailbox. The generated mailing labels may automatically populate an IMb with the mailing label for tracking purposes. When the IMb is scanned at a postal processing facility, the sender may be notified of the progress of the tracked piece of mail. Similarly, the dashboard may have a tracking tab, which may allow the user to track packages and other mail as it is processed and delivered.

Referring again to account management and services layer 312 of FIG. 3, the address book services may include programs related to shipping address validation, contact list export, social media integration, standardized casing, importing outlook contacts, and contact update alerts. The user may have address book functionality to easily facilitate mailing and shipping activity. The address book may feature automated address validation upon upload of any address in to the address book. Alternatively, a user may import a list of validated addresses into a local address book. The address book can also be linked to the user's social graph (Facebook, LinkedIn, etc) to link social profiles to physical street and PO Box addresses. This allows for easier mailing to typical "online only" contacts.

The address book may include a list of names and associated addresses for contacts of the user of the hybrid digital mailbox. The addresses may be confirmed or verified by the USPS or another entity capable of address verification. In preparing a shipment, a user may select between an address contained in the address book or the USPS address on record. The address book may be populated manually, or incoming mail may include the sender's address and may be automatically added to the recipient's address book. The recipient may receive an option to add the sender's address to their address book.

Alternatively, the user may take an image, for example, using a web cam, of a piece of physical mail, and the hybrid-digital mailbox may extract the name and address of the sender and add the name and address into the recipient's address book. Additionally, because the address book in the hybrid-digital mailbox may be linked to a USPS master database of addresses, the address book may be capable of automatically updating a contacts address when the contact updates his or her address with the USPS. For example, when updating their address, an individual may optionally allow the USPS to notify selected individuals, or any individual that include the user's name in an address book, that the address has been changed. Based on this change registered with the USPS master database, the hybrid-digital mailbox may automatically update the address in the user's address book.

The archive services may include programs related to archiving and tagging of various mail pieces received and processed by the hybrid-digital mailbox. For example, the archive services may provide backup functionality for the mailbox to safeguard against data loss.

Figure 5:
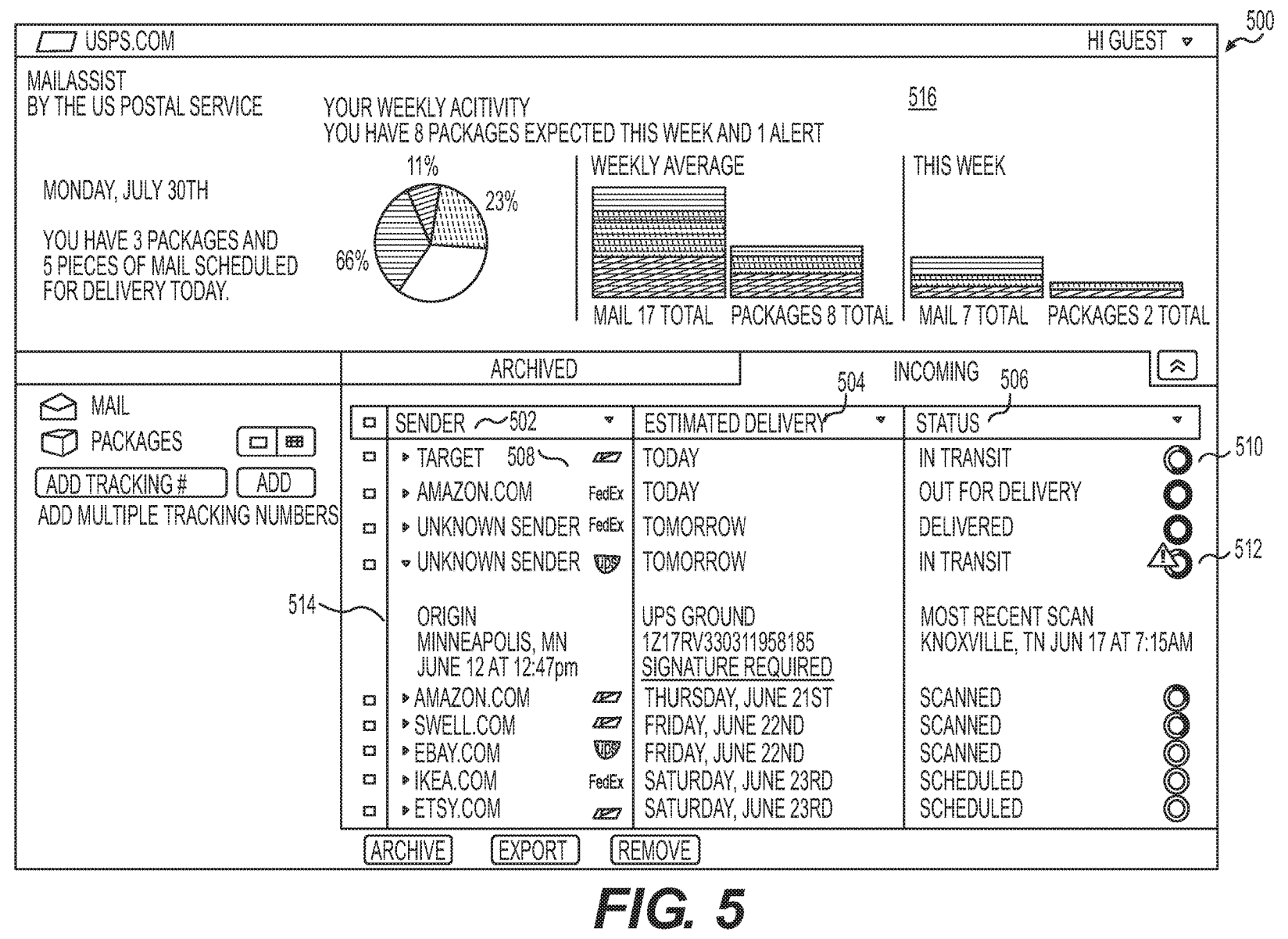

FIG. 5 illustrates an example user interface 500 of an alternate embodiment whereby an inbox portion of the hybrid-digital mailbox pertaining to incoming mail and packages is displayed separately from the outbox portion. The user interface may provide a listing of mail along with relevant information such as a sender 502, estimated delivery date 504, and status of the mail 506. An informational icon 508 may be provided along with the sender to reflect the specific carrier being used to handle the shipment. A status indicator 510 may also be provided, and may visually depict the current status of the shipment. For particular delivery items, an alert or error designation 512 may be provided, alerting the user of the hybrid-digital mailbox that an appropriate alert or error applies to a particular package. Based on alert or error designation 512, the user may select the appropriate line in the interface, causing additional information 514 to be displayed. Based on the additional information, the user can determine that a signature will be required for the particular shipment, and may therefore plan to be at the delivery point to ensure proper delivery.

Example user interface 500 may also visually depict certain statistics 516 relevant to a user of the hybrid-digital mailbox. For example, statistics 516 may visually inform a user of expected deliveries by day or week, may depict a breakdown of types of incoming mail according to a pie chart, or may visually depict weekly amounts and averages of mail and packages received at a particular delivery point. Such visual depictions may quickly and conveniently allow a user to ascertain what types of mail are being received at the delivery point. Example user interface 500 may also provide an Archived mail tab, whereby the user of the hybrid-digital mailbox may view previous deliveries and appropriate information relevant to those deliveries.

FIG. 6 illustrates a user interface 600 whereby incoming mail and packages may be separated into listings 602, where each listing corresponds to a particular day. Thus, at a glance, a user of the hybrid-digital mailbox can determine what packages will be available for delivery on a particular day.

Figure 7:
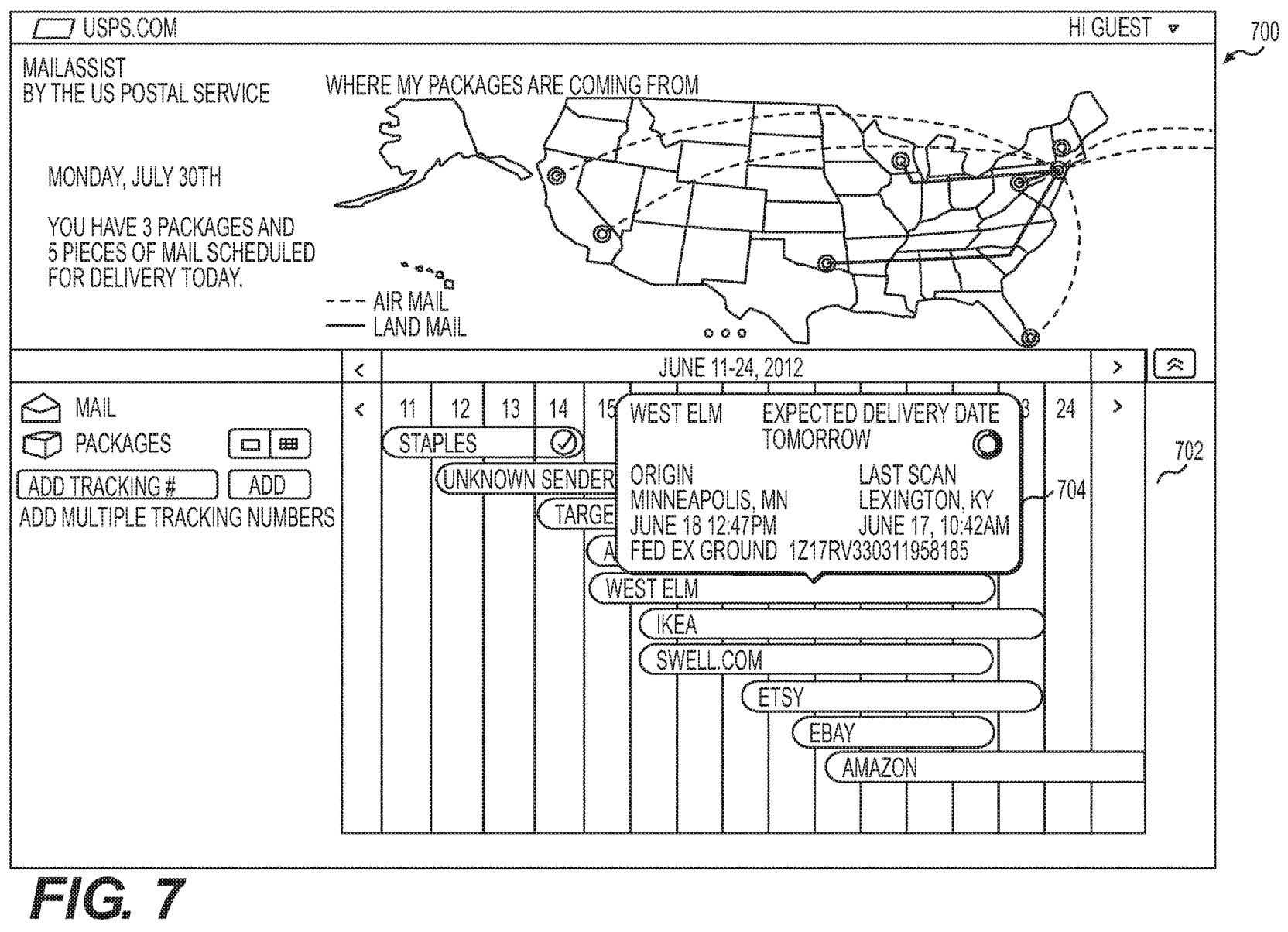

FIG. 7 illustrates a user interface 700 whereby incoming mail and packages are depicted on a timeline 702, which may use a indicators to depict the mailing date and the estimated delivery date of a variety of delivery items. A user of the hybrid-digital mailbox may select one of the indicators corresponding to a particular shipment, causing a popup 704 containing additional information relevant to the selected shipment to be displayed.

Example of Use of Hybrid-Digital Mailbox

When a piece of mail is processed, such as at a mail processing facility, an image of the piece of mail is typically taken while the piece of mail is scanned. Using information taken from this scan of the mail, a user, either a recipient or a sender of the mail, may be notified of the appropriate status of the mail, or other actions taken. The image of the mail may also be sent to the hybrid-digital mailbox, such that the user may view the image from within the mailbox. These actions and information may be coordinated by means of the hybrid-digital mailbox, as outlined by the following examples.

Figure 8:
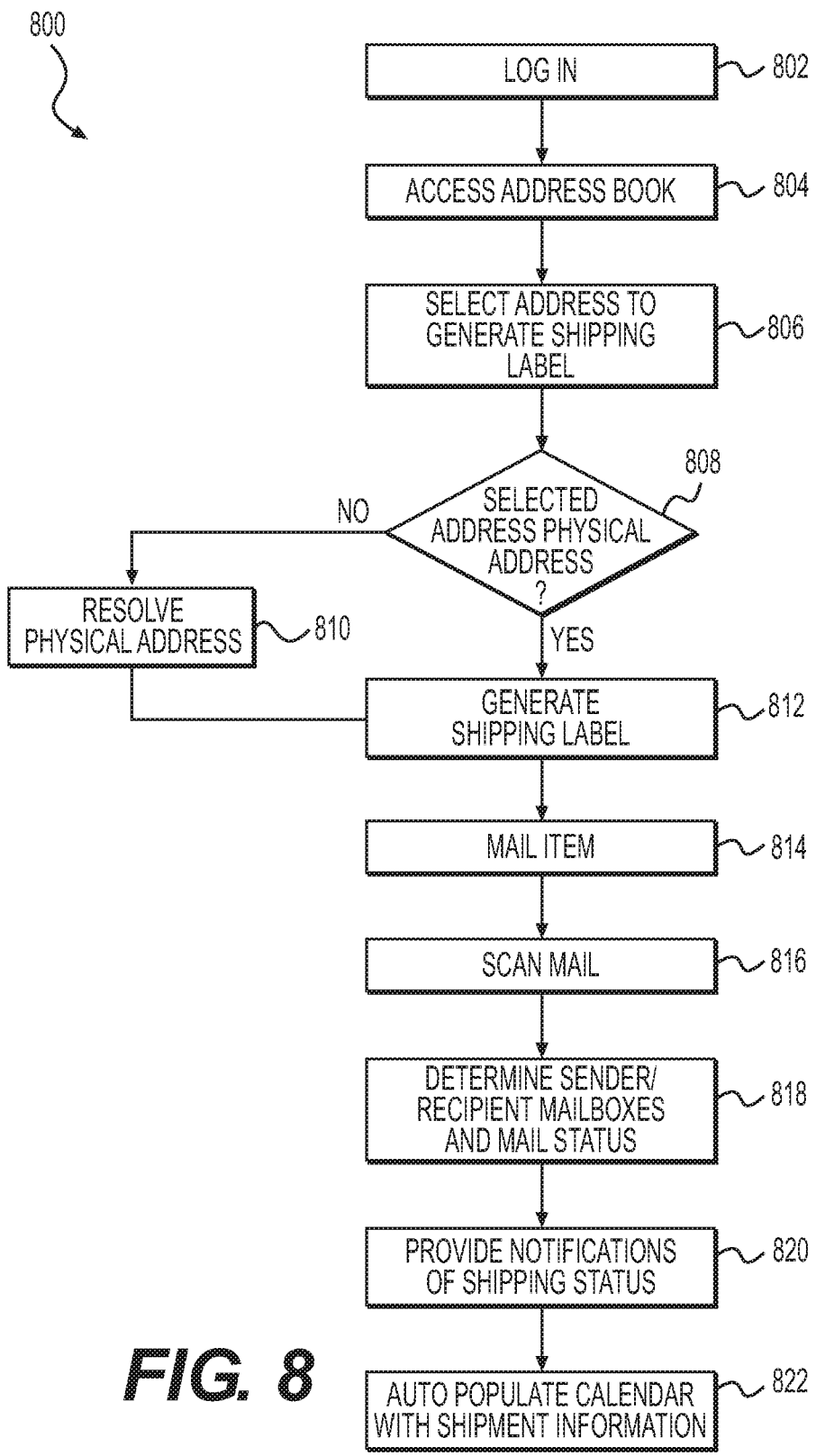
FIG. 8 is a flow diagram of an example method for using a hybrid-digital mailbox.

FIG. 8 is a flowchart representing an example process 800 of the use of a hybrid-digital mailbox, specifically regarding sending of mail in combination with a user's use of the hybrid-digital mailbox. In one example, a sender may desire to send a piece of physical mail to a recipient. The sender may log into the sender's hybrid-digital mailbox (step 802). The sender may then access the address book or mailing labels section of the hybrid-digital mailbox (step 804). As noted earlier, the user may access a local address book, may access a USPS address of record, or may select a contact from the user's social graph (e.g., Facebook) to have an address automatically added. From this section of the mailbox, the sender may select the recipient's address and create a mailing label for the recipient (step 806). In certain embodiments, the address selected for the recipient need not be a physical mailing address, and may instead be an email address.

The hybrid-digital mailbox may then determine whether the selected address is a physical address, or an address needing resolution to physical address (e.g., an email address, telephone number, etc) (step 808). If the selected address for the recipient needs resolution, the hybrid-digital mailbox can access a data repository to attempt to resolve the email address to a corresponding physical address (step 810). This may be performed by accessing a depository of profiles registered with the USPS, and determining whether a physical mailing address has been linked to the email address or phone number selected for the recipient. Once the mailbox determines the appropriate physical address linked to the recipient's email address, a label may be generated (step 812). Then, the sender may print out the mailing label and attach it to the piece of mail to be sent, and may then place the piece of mail in an appropriate depository for mailing with the USPS (step 814). The mailing label may identify the recipient, the sender, and may also uniquely identify the piece of mail. The mailing label may also indicate other properties of the piece of mail.

The USPS may then retrieve the piece of mail and take the piece of mail to an appropriate processing facility. At the processing facility, the piece of mail may be scanned, and an image of the piece of mail may be recorded (step 816). Based on the information on the mailing label that is scanned at the processing facility, a processing system can determine the appropriate hybrid-digital mailboxes (both sender and recipient) associated with the scanned mail piece, along with the appropriate status updates that should be provided to the mailboxes (step 818). A notification may be sent to both the sender and the recipient via the sender and recipient's respective hybrid-digital mailboxes (step 820). For example, the sender may receive a notification that the piece of mail has been scanned and that processing of the piece of mail is taking place. This information may be depicted by providing an appropriate entry in the outbox of the sender's hybrid-digital mailbox, with appropriate identifiers setting forth the type of mailing, the mailing date, and an estimated delivery date. The hybrid-digital mailbox may also provide a progress bar depicting the transit of the mail piece.

Similarly, notification information regarding the shipment of the mail piece may also be provided to the recipient's hybrid-digital mailbox, and an appropriate entry in the inbox may be provided with identifiers depicting that the mail piece is in transit. The recipient's inbox may also provide a progress bar depicting the transit of the mail piece. As a result, a recipient can log into his or her hybrid-digital mailbox, and easily determine that certain mail pieces are currently being transported for delivery to the recipient, and what the expected delivery date is for receipt of the mail piece. Moreover, the recipient can ascertain the type of mail piece, such as a letter or a flat, along with information indicating the sender of the mail piece. The user can also elect to view an image of the mail. In certain embodiments, the notification information may specify related mail items that are also being shipped as part of a separate shipment.

The notification may also contain information regarding upcoming deadlines that may be associated with the piece of mail. Upon receipt of the notification, the hybrid-digital mailbox may automatically populate a user's calendar with any appropriate deadlines associated with the mail piece, along with appropriate reminders and action dates (step 822). The sender may receive information regarding the estimated delivery date of the piece of mail, and this delivery information may be updated on the sender's calendar to indicate the particular date that the mail piece should be delivered. Similarly, the recipient may receive an estimated delivery date that may be recorded on the recipient's calendar. This information can allow the recipient to determine what mail pieces may be arriving by a particular date, allowing the recipient to plan for being at a home address to receive the shipment in advance, or to schedule rerouting of the mail piece to prevent any delivery exceptions from arising, such as if a signature confirmation is required for delivery. Throughout processing of the piece of mail at different mail processing facilities, updates may be sent to the sender and the recipient as the piece of mail passes through additional processing facilities and is taken out for delivery, and these updates may be automatically reflected on the calendar.

If a label is prepared by the sender while logged in to the sender's hybrid-digital mailbox, the label may be automatically associated with the sender's mailbox, even before the label is scanned by a postal processing machine.

When addressing physical mail, the system may allow for any sort of identifying pseudonym or nickname to be used for the recipient that may be recognizable by the system. For example, a letter sent by a sender may be addressed using only an email address of an intended recipient. As long as the system is able to resolve the email address into a physical address, the physical mail may still be properly sent to the appropriate recipient. Alternatively, a sender may provide a phone number or other unique identifier that is not the actual physical address of the recipient, but is linked to the physical address of the recipient within the hybrid-digital mailbox. In this manner, physical mail may be sent without visually identifying the true recipient.

Similarly, pseudonyms or nicknames may be used for the senders address identifier. For example, an individual operating a business from home may desire not to include the individual's home address on business correspondence. In this case, the sender may use an alternative identifier such as the business name. The hybrid-digital mailbox may then resolve the business name into the physical address of the business. Thus, customers of the business or others able to view mail sent by the business may be unable to determine the physical location of the business. Although in many instances this may be undesirable, there remain instances where such secrecy or privacy may be desired.

In some embodiments, optical character recognition (OCR) may be used on the scanned image of the mail piece to help identify the sender. This may be helpful, for example, in instances where the manifest information is incomplete or not present. Using OCR, the system can also selectively autopopulate the sender's address in the recipient's address book, when the recipient receives the notification that the mail is in transit. In other cases, the sender's address may be identified simply via the IMb or mail tracking, especially when the sender is a registered user of a digital-hybrid mailbox.

While the above description provides examples of one or more processes or apparatuses, it will be appreciated that other processes or apparatuses can be within the scope of the accompanying claims.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

What is claimed is:

1. A computer-implemented method, comprising:
resolving, responsive to a user request associated with an electronic calendar application, a physical delivery point associated with an identifier of the user included in the user request by mapping an email address to a physical mailing address;
extracting data from images of at least portions of physical delivery items processed at distributed processing facilities at one or more points of a delivery route of the physical delivery items, the images resulting from scanning the physical delivery items;
requesting from a centralized repository, using at least one processor, delivery data associated with the resolved physical delivery point, wherein the centralized repository includes the extracted data;
receiving, from a tracking database using at least one processor, tracking data regarding a physical delivery item filtered according to the physical mailing address, the tracking data comprising an image of at least a portion of the physical delivery item extracted from the physical delivery item;
determining, based on the delivery data, that the delivery item comprises an incoming bill;
populating a graphical user interface display of a hybrid digital mailbox, the graphical user interface being configured to display representations of incoming physical and electronic delivery items in an inbox;
selecting, by the user, the physical delivery item in the inbox, to reroute the delivery of the physical delivery item to an alternate location;
rerouting delivery of the physical delivery item to an alternate location in response to the user selecting the physical delivery item;
calculating, based on the tracking data, using the at least one processor, an expected delivery date for the physical delivery item;
identifying, using the at least one processor, one or more deadlines associated with the physical delivery item based on the tracking data, at least one of the deadlines being a due date for payment of the bill; and
automatically populating, using the at least one processor, an electronic calendar accessible from the hybrid digital mailbox of the user with the expected delivery date, the image of the portion of the physical delivery item, and the one or more deadlines.

2. The method of claim 1, further comprising displaying the calendar in the user interface.

3. The method of claim 1, wherein the delivery item is addressed to the delivery point of the user.

4. The method of claim 1, wherein an alert is associated with the delivery item to inform the user of the one or more deadlines associated with the delivery item.

5. The method of claim 1, further comprising automatically sending an electronic communication in accordance with the one or more deadlines.

6. The method of claim 1, further comprising:
determining whether delivery of the delivery item requires additional action by the user to complete delivery; and
providing an alert on the electronic calendar to indicate the required additional action.

7. The method of claim 1, further comprising:
identifying content related to the delivery item;
determining at least one delivery date or deadline associated with the related content; and
automatically populating the electronic calendar with the at least one delivery date or deadline associated with the related content.

8. An electronic device, comprising:
a computer-readable storage medium storing instructions; and
a processor executing the instructions to:
resolve, responsive to a user request associated with an electronic calendar application, a physical delivery point associated with an identifier of the user included in the user request by mapping an email address to a physical mailing address;
extract data from images of at least portions of physical delivery items processed at distributed processing facilities at one or more points of a delivery route of the physical delivery items, the images resulting from scanning the physical delivery items;
request, from a centralized repository, delivery data associated with the resolved physical delivery point, wherein the centralized repository includes the extracted data;
receive, from a tracking database, tracking data regarding a physical delivery item filtered according to the physical mailing address, the tracking data comprising an image of at least a portion of the physical delivery item extracted from the physical delivery item;
determine, based on the delivery data, that the delivery item comprises an incoming bill;
populate a graphical user interface display of a hybrid digital mailbox, the graphical user interface being configured to display representations of incoming physical and electronic delivery items in an inbox;
select, by the user, the physical delivery item in the inbox, to reroute the delivery of the physical delivery item to an alternate location;
reroute delivery of the physical delivery item to an alternate location in response to the user selecting the physical delivery item;
calculate, based on the tracking data, an expected delivery date for the physical delivery item;
identify one or more deadlines associated with the physical delivery item based on the tracking data, at least one of the deadlines being a due date for payment of the bill; and
automatically populate an electronic calendar accessible from the hybrid digital mailbox of the user with the expected delivery date, the image of the portion of the physical delivery item, and the one or more deadlines.

9. The electronic device of claim 8, the processor executing instructions to display the calendar in the user interface.

10. The electronic device of claim 8, wherein the delivery item is addressed to the delivery point of the user.

11. The electronic device of claim 8, wherein an alert is associated with the delivery item to inform the user of the one or more deadlines associated with the delivery item.

12. The electronic device of claim 8, the processor executing instructions to automatically send an electronic communication in accordance with the one or more deadlines.

13. The electronic device of claim 8, the processor executing instructions to:
determine whether delivery of the delivery item requires additional action by the user to complete delivery; and
provide an alert on the user's calendar to indicate the required additional action.

14. The electronic device of claim 8, the processor executing instructions to:
identify content related to the delivery item;
determine at least one delivery date or deadline associated with the related content; and
automatically populate the user's calendar with the at least one delivery date or deadline associated with the related content.

15. A tangibly embodied non-transitory computer-readable storage medium storing instructions that, when executed by a processor, perform a method for populating an electronic calendar, comprising:
resolving, responsive to a user request associated with an electronic calendar application, a physical delivery point associated with an identifier of the user included in the user request by mapping an email address to a physical mailing address;
extracting data from images of at least portions of physical delivery items processed at distributed processing facilities at one or more points of a delivery route of the physical delivery items, the images resulting from scanning the physical delivery items;
requesting, from a centralized repository, delivery data associated with the resolved physical delivery point, wherein the centralized repository includes the extracted data;
receiving, from a tracking database, tracking data regarding a physical delivery item filtered according to the physical mailing address, the tracking data comprising an image of at least a portion of the physical delivery item extracted from the physical delivery item;
determining, based on the delivery data, that the delivery item comprises an incoming bill;
populating a graphical user interface display of a hybrid digital mailbox, the graphical user interface being configured to display representations of incoming physical and electronic delivery items in an inbox;
selecting, by the user, the physical delivery item in the inbox, to reroute the delivery of the physical delivery item to an alternate location;
rerouting delivery of the physical delivery item to an alternate location in response to the user selecting the physical delivery item;
calculating, based on the tracking data, an expected delivery date for the physical delivery item;
identifying one or more deadlines associated with the physical delivery item based on the tracking data, at least one of the deadlines being a due date for payment of the bill; and
automatically populating an electronic calendar accessible from the hybrid digital mailbox of the user with the expected delivery date, the image of the portion of the physical delivery item, and the one or more deadlines.

16. The computer-readable storage medium of claim 15, further comprising displaying the calendar in the user interface.

17. The computer-readable storage medium of claim 15, wherein the delivery item is addressed to the delivery point of the user.

18. The computer-readable storage medium of claim 15, wherein an alert is associated with the delivery item to inform the user of the one or more deadlines associated with the delivery item.

19. The computer-readable storage medium of claim 15, further comprising:
   determining whether delivery of the delivery item requires additional action by the user to complete delivery; and
   providing an alert on the user's calendar to indicate the required additional action.

20. The computer-readable storage medium of claim 15, further comprising:
   identifying content related to the delivery item;
   determining at least one delivery date or deadline associated with the related content; and
   automatically populating the user's calendar with the at least one delivery date or deadline associated with the related content.

* * * * *